US007472236B2

(12) United States Patent
Hillier, III et al.

(10) Patent No.: US 7,472,236 B2
(45) Date of Patent: *Dec. 30, 2008

(54) MANAGING MIRRORED MEMORY TRANSACTIONS AND ERROR RECOVERY

(75) Inventors: Philip Rogers Hillier, III, Rochester, MN (US); Joseph Allen Kirscht, Rochester, MN (US); Elizabeth A. McGlone, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/927,901

(22) Filed: Oct. 30, 2007

(65) Prior Publication Data
US 2008/0052568 A1     Feb. 28, 2008

Related U.S. Application Data

(63) Continuation of application No. 11/050,291, filed on Feb. 3, 2005, now Pat. No. 7,328,315.

(51) Int. Cl.
*G06F 12/00* (2006.01)

(52) U.S. Cl. ........................ 711/149; 711/154; 711/158; 711/168

(58) Field of Classification Search ........................ None
See application file for complete search history.

(56) References Cited

U.S. PATENT DOCUMENTS

| 6,061,732 | A | * | 5/2000 | Korst et al. ................. 709/231 |
| 6,092,231 | A | * | 7/2000 | Sze ............................ 714/758 |
| 6,360,285 | B1 | * | 3/2002 | Fenwick et al. .............. 710/17 |
| 6,615,375 | B1 | * | 9/2003 | Mounes-Toussi et al. ..... 714/54 |
| 6,785,793 | B2 | | 8/2004 | Aboulenein et al. |
| 7,017,017 | B2 | * | 3/2006 | Dahlen et al. ............... 711/157 |
| 2004/0093472 | A1 | | 5/2004 | Dahlen et al. |
| 2004/0221111 | A1 | | 11/2004 | Phelps et al. |

* cited by examiner

*Primary Examiner*—Kevin Ellis
*Assistant Examiner*—Alan M Otto
(74) *Attorney, Agent, or Firm*—Dillon & Yudell LLP

(57) ABSTRACT

In a data processing system having a memory control device including at least two mirrored memory ports, a method and computer-readable medium for processing read requests are disclosed herein. In accordance with the method of the present invention, a read request is received on a system interconnect coupling read requestors with memory resources. The received read request is issued only to a specified one of the at least two mirrored memory ports within the memory control device. In response to detecting an unrecoverable error resulting from the read request issued to the one mirrored memory port, the received read request is issued to an alternate of the at least two mirrored memory ports.

18 Claims, 5 Drawing Sheets

MANAGING MIRRORED MEMORY TRANSACTIONS AND ERROR RECOVERY

The present application is a continuation of U.S. patent application Ser. No. 11/050,291 filed on Feb. 3, 2005, now U.S. Pat. No. 7,328,315 and entitled System and Method for Managing Mirrored Memory Transactions and Error Recovery, which is incorporated herein by reference.

BACKGROUND OF THE INVENTION

1. Technical Field

The present invention relates generally to fault tolerant data processing systems and in particular to managing memory access operations in mirrored memory systems. More particularly, the present invention relates to a system and method for scheduling and processing read transactions in a mirrored memory system such as may be performed by memory access control logic.

2. Description of the Related Art

Computer failures can result from malfunctioning disk drives, memory or processors, conflicts between hardware components, software errors, and environmental interference among other things. Solutions for curbing the negative effects of such failures have included, for example, Predictive Failure Analysis (PFA), which provides autonomous monitoring of specified system parameters or failure conditions. PFA is commonly utilized in data storage or memory applications to predict and issue alerts warning of actual or imminent device failures. This allows a system administrator to either hot-swap the faulty component or schedule downtime at low-impact periods for the component to be fixed or replaced.

While PFA has provided substantial gains in preventing data loss and minimal runtime interruption for disk drive systems such as RAID systems, neither PFA nor other system failure warning or recovery techniques have adequately addressed data loss and system interruption caused by an actual memory data error. A solution directed to providing backup redundancy in the face of an actual data error resulting from a system failure or otherwise is generally known as mirroring. In disk mirroring, data is written to two duplicate disks simultaneously in disk drive systems such as RAID level-I systems. If one of the mirrored disk drives fails, the system switches to the other disk without any loss of data or service.

So-called memory mirroring is similar to disk mirroring to the extent it involves maintaining alternate copies of memory contents in two different regions of memory. Memory mirroring involves storing data to two different memory locations such that a backup copy is always available. Memory mirroring has become a key reliability feature for large scale server systems, such as the xSeries line of high performance servers from IBM Corporation. Fundamentally, memory mirroring operates such that responsive to detecting an uncorrectable data error, the second copy is accessed, thus avoiding loss of data and processing service similar to the disk mirroring scenario. A memory controller or equivalent device must be able to access the backup memory region when an error is detected in the first memory region. This type of access for retrieving a backup memory copy responsive to a detected error is commonly referred to as a mirror failover read.

Conventional mirrored memory architectures employ synchronization of two memory ports to accomplish memory mirroring. Such synchronization requires that each memory access request be issued to both ports of the respective mirrored memory regions simultaneously. Writes are issued to both ports, guaranteeing coherent memory. Read requests are also issued to both ports which return the data to a central data buffer simultaneously. If an uncorrectable error is detected for one of the reads, the corresponding port blocks the write enable to the central data buffer to prevent erroneous data from being accessible on the system bus. As a result, only the correct data or instructions (collectively referred to herein as data) are written to and accessible from the central data buffer. In this manner, conventional mirror failover read operations prevent system-wide failures that would otherwise result from uncorrectable memory errors.

The foregoing simultaneous dual access architecture is problematic in terms of sheer complexity. Both ports must be synchronized for each data access operation, even if the command is generated by separate memory controller entities such as scrub controllers which control scheduled testing, detecting, and reporting of memory errors.

Another problem with the foregoing conventional mirrored memory management is the dramatic reduction in available port bandwidth resulting from the using both ports for what is effectively a single memory access operation. Given the relative rarity of memory errors in such systems and that system memory access has traditionally been the greatest contributor to system latency, the impact of dual access on system bandwidth is particularly disadvantageous.

It can therefore by appreciated that a need exists for an improved system and method for managing mirrored memory access operations that maintains the system reliability aspects of backup memory while reducing the system bandwidth penalty associated with conventional mirrored memory systems. The present invention addresses this as well as other problems unaddressed by the prior art.

SUMMARY OF THE INVENTION

In a data processing system having a memory control device including at least two mirrored memory ports, a method and computer-readable medium for processing read requests are disclosed herein. In accordance with the method of the present invention, a read request is received on a system interconnect coupling read requestors with memory resources. The received read request is issued only to a specified one of the at least two mirrored memory ports within the memory control device. In response to detecting an unrecoverable error resulting from the read request issued to the one mirrored memory port, the received read request is issued to an alternate of the at least two mirrored memory ports.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT(S)

The present invention is generally directed to a system, method and computer program product for managing access to memory devices employing memory mirroring redundancy. The present invention provides a system and method that improve upon conventional dual access mirrored memory systems in which each memory access operation received by a memory controller on the system interconnect is delivered to and processed by both of the mirrored memory ports or channels. The present invention addresses bandwidth allocation problems associated with memory controllers that utilize a simultaneous, bilateral approach to processing write or store operations by employing a unilateral read or load processing technique. As explained in further detail below with reference to the figures, the present invention is further directed to an error recovery mechanism that leverages the features of the unilateral read processing technique FIG. 1 and the following discussion are intended to provide a brief, general description of an exemplary data processing system adapted to implement the present invention. While the invention will be described in the general context of specifically labeled electronic and program modules running within a multiprocessor type computer, those skilled in the art will recognize that the invention also may be implemented in combination with other program modules to achieve the same results. Generally, program modules include routines, programs, components, data structures, etc. that perform particular tasks or implement particular abstract data types. Moreover, those skilled in the art will appreciate that the invention may be practiced with other computer system configurations employing multiprocessor design, including hand-held devices, microprocessor-based or programmable consumer electronics, minicomputers, mainframe computers, and the like.

Figure 1:
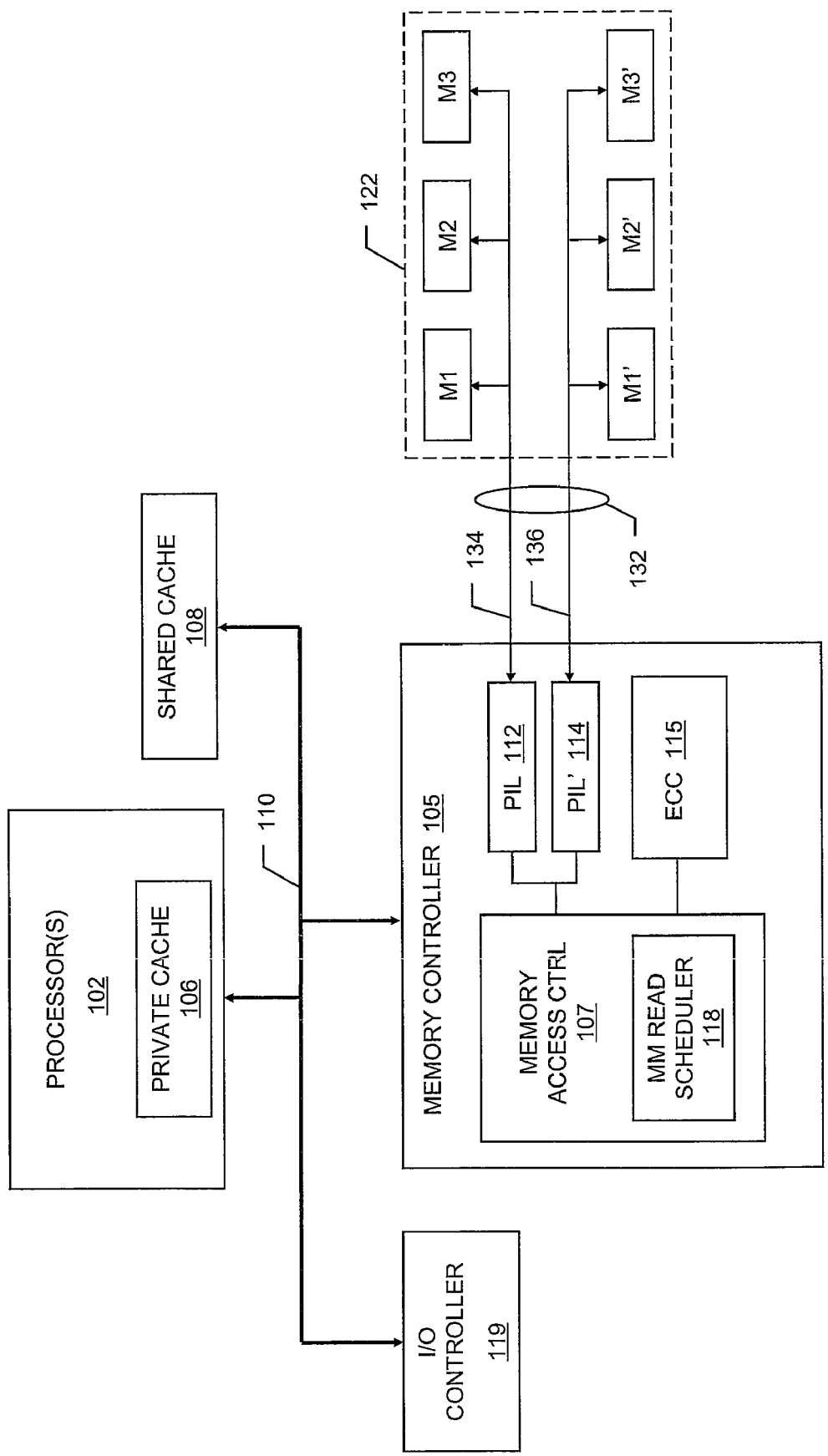
FIG. 1 is a high-level block diagram illustrating a data processing system employing a memory controller having mirrored memory management and error recovery functions in accordance with a preferred embodiment of the invention.

With reference now to the figures wherein like reference numerals refer to like and corresponding parts throughout, and in particular with reference to FIG. 1 there is depicted a high-level block diagram illustrating a data processing system employing a memory controller having mirrored memory management and error recovery functions in accordance with a preferred embodiment of the invention. As shown in FIG. 1, the data processing system generally comprises one or more processors 102 and associated private cache 106 (typical on-board level 1 cache). A system interconnect 110 communicatively couples processor 102 with further levels of memory hierarchy including a shared cache module 108. Those skilled in the art will appreciate that system interconnect 110 may be a shared bus or switched architecture depending on the access configuration. An input/output (I/O) controller 119 is also coupled to system interconnect 110 for connecting peripheral devices such as hard disk drives, user I/O devices, etc. to processor 102 and memory components.

The depicted data processing system further includes a main system memory 122, memory bus 132, and memory controller 105. While depicted as separate blocks for illustrative ease and simplicity, those skilled in the art will appreciate that processor 102, private cache 106 and memory controller 105 may reside on the same physical integrated circuit (IC) chip. System memory 122 may be dynamic random access memory (DRAM), synchronous DRAM (SDRAM), SDRAM/double data rate (SDRAM/DDR), etc. The invention relates particularly to management of memory access operations (e.g. access requests targeting memory 122) in a mirrored memory environment. As utilized herein, memory access operations include reads (sometimes referred to as loads) and writes (sometimes referred to as stores).

Memory controller 105 is typically a hardware logic circuit that controls system memory 122 in terms of generating and processing the signals necessary for controlling reading and writing of data or instructions from and to memory 122. In the example shown in FIG. 1, memory controller 105 includes memory access control logic 107 that controls reading and writing between memory controller 105 and memory devices within system memory 122. In support of read-type memory access operations, memory access control logic 107 operates in either an interleaved or a non-interleaved read command processing mode as discussed in further detail below.

In an important feature of the present invention, the memory subsystem defined by memory controller 105 and system memory 122 employs memory mirroring in which a first bank of memory modules M1, M2, and M3 is mirrored (data contained therein is replicated) within a corresponding set of mirrored memory modules M1', M2', and M3'. A pair of channels, or ports 134 and 136 communicatively couples memory controller 105 with the respective mirrored memory module sets M1, M2, and M3, and M1', M2', and M3'. In support of the memory access processing conducted over the ports, memory controller 105 further comprises a pair of port interface logic modules 112 and 114 for respectively interfacing ports 134 and 136 with a memory access control logic module 107.

As further depicted in the exemplary embodiment, memory controller 105 includes failure detection circuitry 115 that detects failures in the memory assemblies. In a preferred embodiment, failure detection circuitry includes many of the features included in so-called error code correction (ECC) circuits.

A correctable failure is one that can be corrected without copying data from redundant memory resources such as mirror memory modules M1', M2', and M3'. In accordance with the invention, correctable failures are not processed as failure events that would otherwise necessitate re-issuing an originally received and processed read request.

In general, a read request is processed by the data processing system depicted in FIG. 1 as follows. The address of the memory location to be read is placed on the address portion of system bus 110. Memory controller 105 decodes the memory address and determines which chip(s) within system memory 122 are to be accessed. The lower half of the address, or "row", is sent to the memory chip to be read. After allowing a sufficient time for the row address signals to stabilize, memory controller 105 sets the row address select (RAS) signal to zero. When the RAS signal has settled to zero, the entire row selected is read by the circuits in the chip. Next, the upper half of the address, or "column", is sent to the memory chip(s) to be read. After allowing sufficient time for the column address to stabilize, memory controller 105 sets the column address select (CAS) signal to zero. When the CAS signal has settled at zero, the selected column is fed to the output buffers of the chip. The output buffers of all the accessed memory chips feed the data onto the data bus portion of memory bus 132, where processor 102 or other requesting device can retrieve the data.

In conventional mirrored memory systems, the foregoing multi-step process, which may further include additional timing signals and performance enhancements such as multiple-banked modules, burst mode, etc., must be performed in tandem by each of the mirrored ports. In accordance with the present invention, memory controller 105 further comprises a mirrored memory read scheduler module 118 and other associated logic that may be deployed from any combination of the depicted memory controller modules to enhance the efficiency of read access operations. As explained below with reference to FIGS. 2-4, the present invention provides an improved read access and failover processing technique that maintains the reliability of mirrored memory while effectively doubling read processing bandwidth for the overall system.

Figure 2:
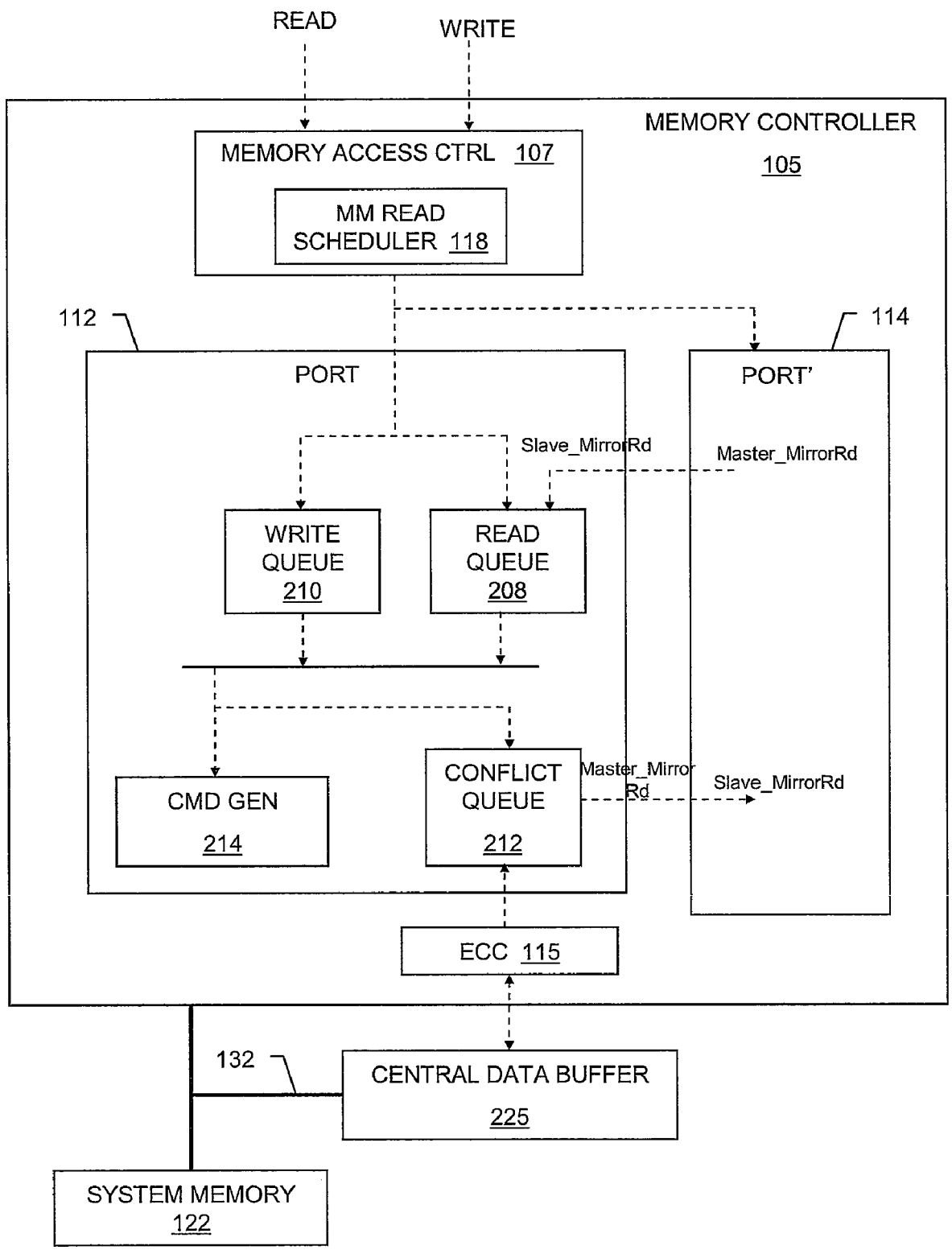
FIG. 2 is a more detailed block diagram depicting features and components of a memory subsystem designed in accordance with a preferred embodiment of the invention.

FIG. 2 is a more detailed block diagram depicting features and components of a memory subsystem designed in accordance with a preferred embodiment of the invention. The depicted memory subsystem generally comprises memory controller 105 receiving read and write requests from system bus 110 and coupled to system memory 122 via memory bus 132. Within memory controller 105, memory access control logic 107 includes logic for receiving and processing memory access requests, including read and write requests, from system bus 110 and to control the return of data to the system bus. Memory access control logic 107 is communicatively coupled to each of port interface logic modules 112 and 114.

A more detailed block diagram representation is presented of port interface logic module 112 for illustrative purposes and is understood to extend similarly or identically to port interface logic module 114. Port interface logic 112 generally comprises logic for controlling the flow of data between memory controller 105 and system memory 122. In the exemplary embodiment, port interface logic 112 includes read and write request buffers 208 and 210 that allow pending read and write requests to be temporarily stored before being selectively interpreted and issued onto memory bus 132 by a command generator module 214. Command generator module 214 may include arbitration logic (not shown) that selects a read or write request from a number of pending requests within queues 208 and 210 to be sent to memory 122. Also coupled to memory bus 132, in association with the port interface logic modules 112 and 114, a central data buffer 225 tracks and stores data for all active read and write transactions and sends/receives data between system bus 110, system memory 122, and other interfaces such as scalability and front side bus logic (not shown).

Once an access request is sent to system memory 122, the request is also placed in a conflict queue 212 to be compared against subsequently processed read and write requests. Namely, part of the arbitration process performed by command generator module 214 includes comparing the chip select group and memory bank of the pending memory access request to the requests currently in conflict queue 212. All pipeline depths are accounted for during the conflict compares. For instance, if it takes 4 pipeline stages to get from the read queue to request sent, a minus 4 value is compared against the conflicts. This allows the queued up requests to be dispatched without incurring any extra latency. If there is a conflict in terms of concurrent requests accessing the same area of memory, delivery of the conflicting request is delayed, and the arbitration logic selects another, non-conflicting request.

Pending the foregoing arbitrations, conflict queue 212 holds a given request until the object read, write, refresh, etc., sequence is completed. When a read request is placed in conflict queue 212, the data or instruction is returned in a pre-specified number of cycles. Conflict queue 212 includes circuitry for counting the specified number of cycles and prompts the data return processing logic (not shown) when to expect the returned data and further prompts the pending queues 210 and 208 of when the request will be completed. Because the various hardware platforms may require different numbers of cycles to execute a given memory access request, the foregoing conflict queue counter values are preferably fully programmable by the system BIOS.

The present invention relates particularly to a method for processing memory access operations such as reads (alternately referred to as loads for instructions) and writes (alternately referred to as stores for instructions). Included in the improved memory access processing method, the present invention provides a method for handling memory errors that occur on a given read operation. The memory access method of the present invention is performed in part, by logic included within a mirrored memory read scheduler 118 that is preferably deployed from memory access control logic 107.

Figure 3:
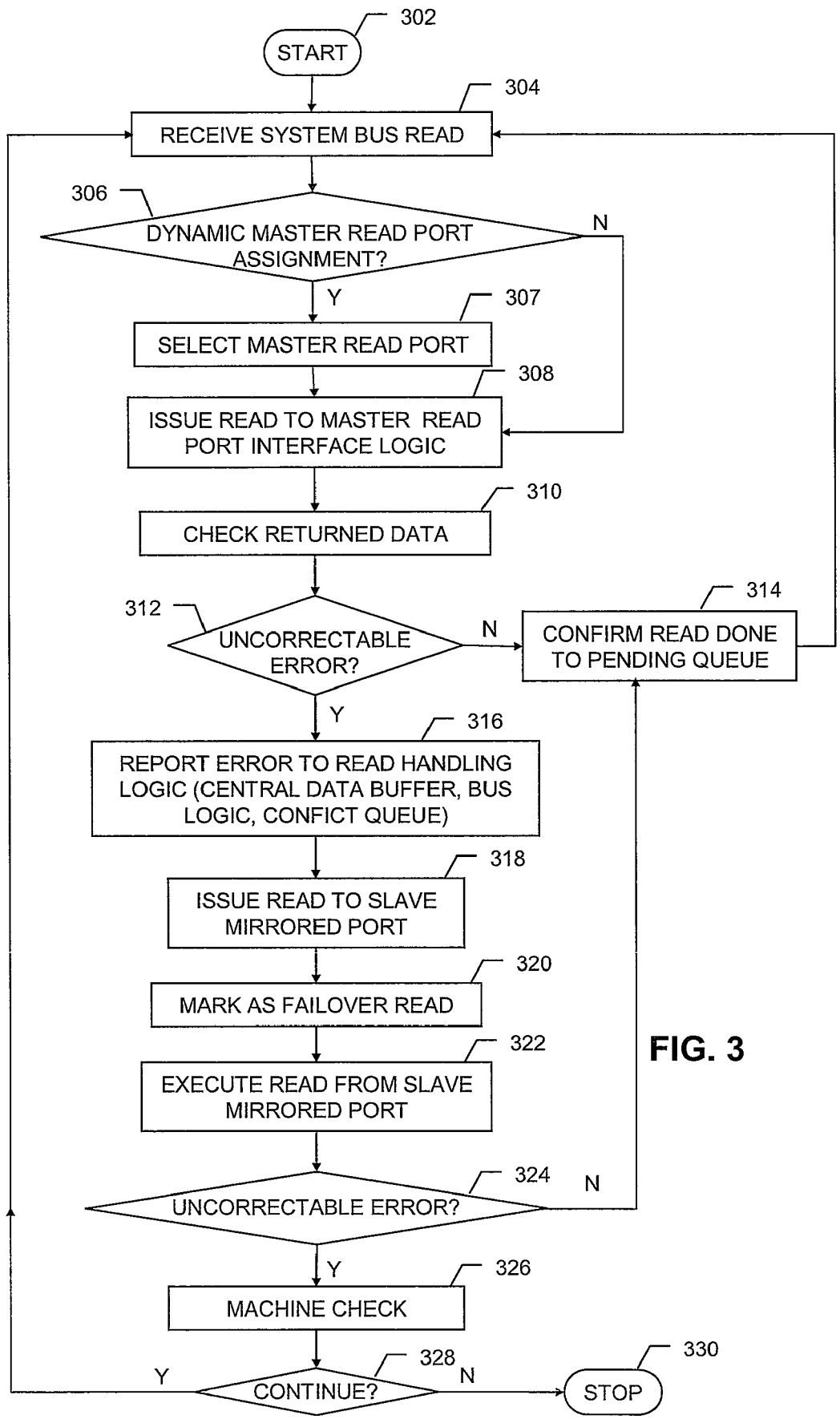
FIG. 3 is a high-level flow diagram illustrating steps performed during mirrored memory management and error recovery in accordance with the present invention.

With reference to FIG. 3, there is depicted a high-level flow diagram illustrating mirrored memory management and error recovery steps performed by the data processing system and memory subsystem depicted in FIGS. 1-2 in accordance with the present invention. The process begins with a system initialization or similar startup as shown at step 302 and proceeds to step 304 with a read request being received by memory controller 105 on system bus 110. The process continues with a method, implemented in a data processing system having a memory controller including at least two mirrored memory ports, for processing the read request between the system bus and system memory in which one of the mirrored ports is specified as the "primary" read port with the remaining ports designated "secondary" read ports. Next, the read request received on system bus 110 is processed by memory controller 105 depending in part, as depicted at step 306, on whether or not the assignment of the primary port for handling read requests is pre-specified or is dynamically determined in accordance with read and/or write request processing. If the primary port assignment is static, the process continues at step 308 with the received read request being issued by memory access control logic 107 only to the pre-specified primary read port, such as to port interface logic 112 supporting port 134. If the primary read port assignment is dynamic (i.e. changes over time in accordance with one or more aspects of memory access processing), the logic in mirrored memory read scheduler 118 selects which of the two or more mirrored ports, such as between ports 134 and 136, is to be utilized for unilaterally processing at least the last received read request. Several techniques for selecting the primary read port for a given one or more read requests are illustrated and explained below with reference to FIGS. 4A-4D.

Continuing with the read request and error processing method depicted in FIG. 3, responsive to the received read request being issued only to a single (i.e. primary) of the multiple available mirrored memory ports (step 308), the data returned from the read request is checked by ECC logic 115 as shown at step 310. Proceeding as illustrated at steps 312, 314, and 304, responsive to no uncorrectable error (i.e. error requiring a data replacement for the retrieved data) being detected by ECC logic 115, a read done signal indicating the read request processing has successfully terminated is sent to read queueing/processing logic within memory controller 105 and the process continues with the next queued read request received on the system bus 110.

If, as illustrated at steps 312 and 316, ECC logic 115 detects an unrecoverable error resulting from the read request issued only to the designated primary read port, the error is reported by one of various signaling methods to read handling logic deployed by or associated with memory controller 105. One such error reporting signaling technique preferably includes marking the pending read request as a failover read request. The read handling logic to which the error is issued or reported may include any combination of central data buffer 225, conflict queue 212, and other memory bus logic. In one embodiment, central data buffer 225 responds to the notification of the failed read/invalid data condition by rejecting the returned data as invalid. In a preferred embodiment, conflict queue 212 responds to the receipt of the uncorrectable error signal by holding onto the corresponding read request rather than indicating read done to pending queue 208 as it otherwise would at step 314. In further response to the uncorrectable error signal, and as depicted at step 318, logic associated with conflict queue 212 issues the read request to one of the secondary ports (i.e. ports not designated "primary" to which read originally issued). It should be noted that in a preferred embodiment, and referring to FIG. 2 in conjunction with FIG. 3, conflict queue 212 waits for the ECC checking to complete prior to confirming read done such that the read request is re-mastered to the alternate port 114 prior to conflict queue 212 releasing the request.

In association with step 318, the re-directed and re-issued read request is marked as a failover read or otherwise designated (step 320) such that the secondary or "slave" mirrored port recognizes a failover condition that will alter the manner in which the re-issued read request is processed if an unrecoverable error again occurs. Namely, and as illustrated at step 322, the re-issued read request is executed from the secondary mirrored memory port and if no uncorrectable error is detected by ECC logic 115, the process continues with confirmation of read done to the pending queue, and queuing of the next system bus read request (steps 324, 314, 304). If, however, an uncorrectable error is detected for the data returned from the reissued read request (step 324), the secondary mirrored memory port, having read the failover read signal, issues a signal or message that prompts a machine check for the memory subsystem (step 326) and memory access processing continues or terminates depending on whether the error condition necessitates a system shutdown (steps 328 and 330).

In addition to a method for managing read requests and failover conditions, the present invention comprises several alternate techniques for selecting/assigning the "primary" read port for unilaterally processing any given read request. One such selection mechanism comprises mirrored memory read scheduler 118 issuing read requests received on the system bus to two or more mirrored ports in an alternating, interleaved manner. Alternating read request processing between the typically two mirrored ports may be achieved using pointer and register update techniques. If an uncorrectable error is detected by ECC logic 115 at a given one of the mirrored ports, the basic input output system (BIOS) may set memory controller 105 to deliver system bus read requests only to the other mirrored port or the interleaving process may continue until a specified threshold of errors per unit time is reached at which time a single specified primary port is utilized for processing system bus reads. Alternate embodiments for assigning the primary read port are depicted and explained with reference to FIGS. 4A-4D.

Figure 4A:
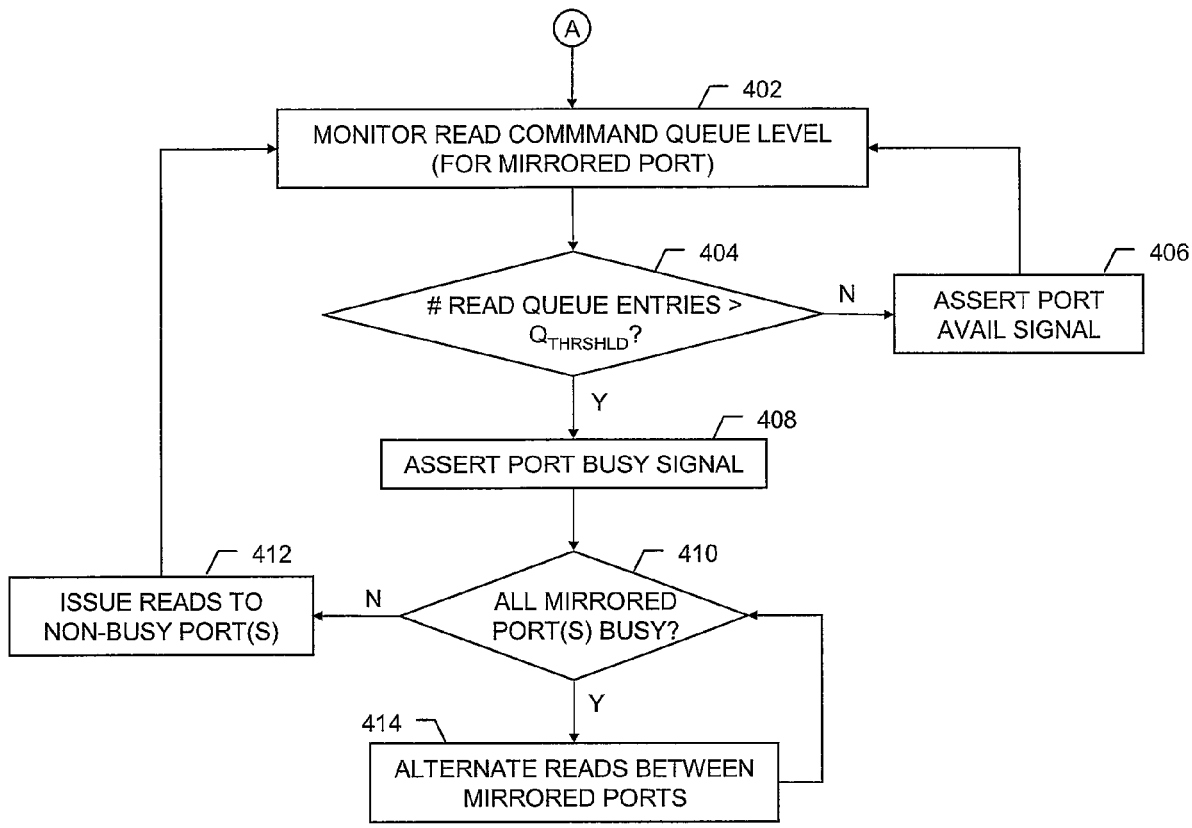
FIGS. 4A-4D are flow diagrams depicting methods for selecting a primary mirrored memory port in accordance with the mirrored memory management process of the invention.

Referring to FIG. 4A, there is depicted a high-level flow diagram depicting steps performed within a memory subsystem such as that shown in FIG. 2, for assigning one of the multiple mirrored memory ports, such as ports 134 and 136, to be the primary mirrored memory port for unilaterally processing one or more read requests. The process depicted in FIG. 4A commences at step 402 with mirrored memory read scheduler logic 118 monitoring the queue level of pending read requests within read queue 208. If, as illustrated at steps 404, 406, and 402, the queue level, as measure by the number of individual read queue entries within read queue 208 or otherwise, does not exceed a specified queue Threshold, a port available signal is asserted in association with the port in question and the port is eligible for selection/assignment by mirrored memory read scheduler 118 as the primary read port that will unilaterally process at least a next read request received on system bus 110. In a preferred embodiment, the monitoring and queue level determination depicted at steps 402 and 404 is implemented using a programmable watermark register (not depicted) that compares the number of queued read requests with a programmed threshold value.

Returning to inquiry step 404, if the pending read queue level is greater than or equal to the specified threshold level, a port busy signal is asserted in association with the port in question. Proceeding as shown at step 410, if there is at least one mirrored memory port marked as "available" as per steps 402, 404, and 406, mirrored memory read scheduler 118 effectively assigns the primary read port by issuing the system bus received read request to only one port marked available as per step 406. Returning to step 410, if all mirrored ports in the memory subsystem are indicated as "busy" as per steps 402, 404, and 408, mirrored memory read scheduler 118 issues a next one or more system bus read requests in an alternating manner between each of the mirrored ports as shown at step 414.

Figure 4B:
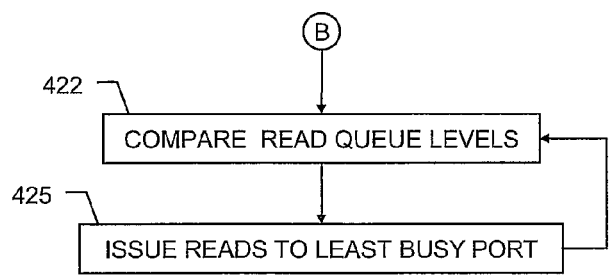

In a related variant of the method shown at FIG. 4A, FIG. 4B illustrates a method for selecting the primary read port by sending the queue levels/counts of each read queue of the respective ports to mirrored memory read scheduler 118. Mirrored memory read scheduler 118 compares the read queue levels from the respective ports (step 422) and issues any given read to the port having the least busy read queue (step 425).

Figure 4C:
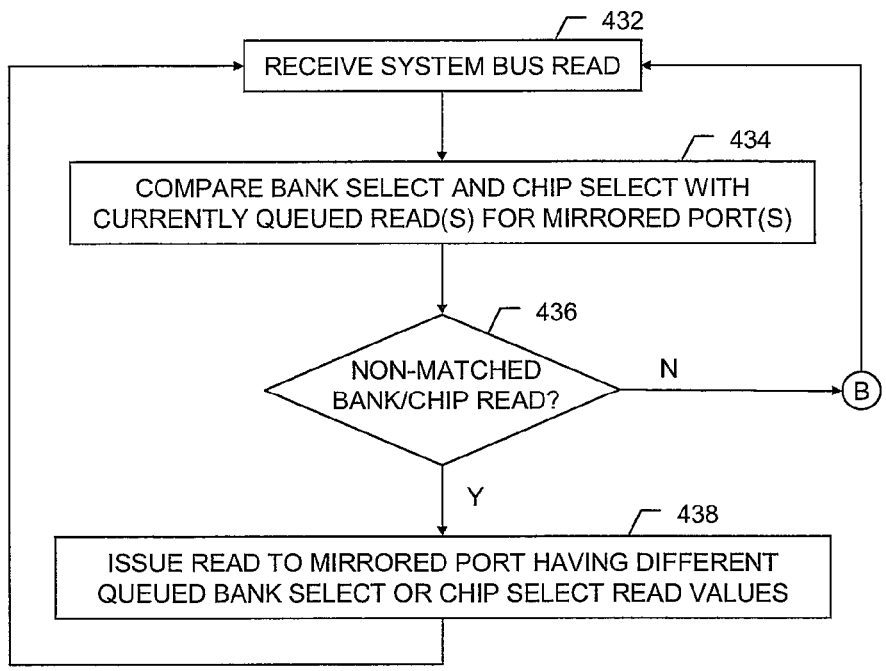

With reference to FIG. 4C, there is depicted a high-level flow diagram depicting an alternate method performed within a memory subsystem such as that shown in FIG. 2, for assigning one of the multiple mirrored memory ports, such as ports 134 and 136, to be the primary mirrored memory port for unilaterally processing one or more read requests. The process commences as shown at step 432 with a read request being received by memory controller 105 on system bus 110. Next, mirrored memory read scheduler 118 compares memory device bank select and chip select of the next read within any pending read requests queued in the mirrored port interface logic modules 112 and 114. The scheduler responds to the comparison by issuing the system bus received read request to the port having a non-matching bank and/or chip select identifier (step 438) and the process returns to step 432. If it is determined that the bank select and chip select identifiers for pending read requests in both the mirrored ports matches those of the presently received read request, the primary read port may be determined by the method illustrated in FIG. 4B.

Figure 4D:
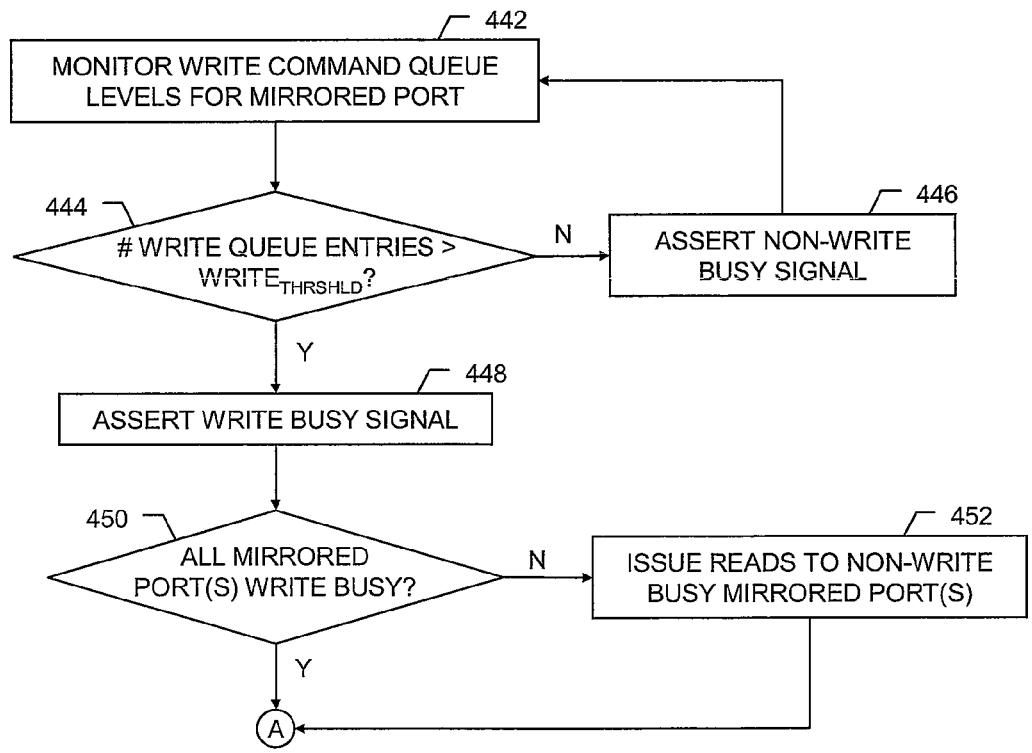

FIG. 4D is a high-level flow diagram illustrating an alternate method performed within a memory subsystem such as that shown in FIG. 2, for assigning one of the multiple mirrored memory ports, such as ports 134 and 136, to be the primary mirrored memory port for unilaterally processing one or more read requests. The process begins at step 442 with mirrored memory scheduler 118 directly or indirectly monitoring the queue level of pending write requests within write queue 210. If, as illustrated at steps 444, 446, and 442, the queue level, as measure by the number of individual write queue entries within queue 210 or otherwise, does not exceed a specified queue threshold, a non-write busy signal is asserted in association with the port in question and the port is eligible for selection/assignment by mirrored memory read scheduler 118 as the primary read port that will unilaterally process at least a next read request received on system bus 110. In a preferred embodiment, the monitoring and queue level determination depicted at steps 442 and 444 is implemented using a programmable watermark register (not depicted) that compares the number of queued write requests with a programmed threshold value.

Returning to inquiry step 444, if the pending write queue level is greater than or equal to the specified threshold level, a write busy signal is asserted in association with the port in question. Proceeding as shown at steps 450 and 452, if there is at least one mirrored memory port marked as "non-write busy" as per steps 442, 444, and 446, mirrored memory read scheduler 118 effectively assigns the primary read port by issuing the system bus received read request to only one port marked non-write busy as per step 446. Returning to step 450, if all mirrored ports in the memory subsystem are indicated as write busy as per steps 442, 444, and 448, mirrored memory read scheduler 118 proceeds with selecting the primary read port by the method depicted in FIG. 4A.

While the invention has been particularly shown and described with reference to a preferred embodiment, it will be understood by those skilled in the art that various changes in form and detail may be made therein without departing from the spirit and scope of the invention.

What is claimed is:

1. A method for processing read requests in a data processing system having a memory control device with at least two mirrored memory ports, said method comprising:

receiving a read request on a system interconnect by a memory access control module within a memory controller that generates and processes signals for reading and writing data from and to a system memory that employs memory mirroring in which a first set of memory modules is mirrored by a corresponding second set of memory modules, wherein said memory access control module controls reading and writing between said memory controller and said first and second sets of memory modules, wherein said memory controller includes a pair of port interface modules for respectively interfacing each of said pair of memory ports with said memory access control module, each of said pair of port interface modules includes a write request buffer for storing pending write requests received by said memory access control module;

a read request buffer for storing pending read requests received by said memory access control module;

a command generator module having arbitration logic for selecting a read or write request to be issued onto said memory bus from among a plurality of pending read and write requests stored within said read and write request buffers; and a conflict queue module for, in response to read and write requests being issued onto said memory bus, holding said issued read and write requests pending processing;

coupling a memory bus having a pair of memory ports to said memory controller with said first and second set of memory modules;

coupling a central data buffer to said memory bus, wherein said central data buffer stores data for pending read and write requests issued onto said memory bus;

coupling an error detection module to said central data buffer, wherein said error detection module contains logic for detecting uncorrectable errors in data returned by execution of read requests;

issuing said received read request by a read scheduler only to a specified one of said at least two mirrored of memory ports; and responsive to receiving an uncorrectable error signal from said error detection module indicating an unrecoverable error resulting from said read request issued to said one mirrored memory port, issuing said received read request to an alternate of said at least two mirrored memory ports prior to reporting a read request status to said read request buffer and holding the corresponding read request during said issuing of said read request to said alternate memory port prior to said reporting said read request status to said read request buffer.

2. The method of claim 1, wherein said error detection module includes logic for detecting an error in the data returned responsive to said read request issued to said specified memory port.

3. The method of claim 1, further comprising logic for marking said read request issued to said alternate memory port as a failover read request.

4. The method of claim 3, further comprising, logic responsive to detecting an uncorrectable error resulting from said read request issued to said alternate memory port, that commences a machine check of memory devices coupled to said memory control device.

5. The method of claim 1, wherein said memory controller further includes logic that selects said specified one of said memory ports to unilaterally process one or more read requests.

6. The method of claim 5, wherein said logic selecting said specified one of said memory ports to unilaterally process one or more read requests includes logic that selects between said pair of memory ports in an alternating manner to select the memory port to issue a given read request.

7. The method of claim 5, wherein said logic selecting said specified one of said memory ports to unilaterally process one or more read requests includes:

means for monitoring a read request queue level for each of said pair of memory ports;

logic means responsive to determining that said read request queue level for a given one of said memory ports is less than a specified threshold level, that asserts a port available signal corresponding to said given memory port;

logic means responsive to determining that said read request queue level for one or both memory ports is greater than or equal to a specified threshold level, that asserts a port busy signal corresponding to said one or both memory ports; and logic that prioritizes said memory ports for being selected as a primary memory port such that said memory port having port available asserted is selected as the primary mirrored memory port prior to said memory port having port busy asserted.

8. The method of claim 5, wherein said logic selecting said specified one of said memory ports to unilaterally process one or more read requests includes:

logic that compares read request queue levels of said pair of memory ports; and circuitry that issues read requests to said memory port having the lower read request queue level.

9. The method of claim 5, wherein said read request issued to said specified memory port is associated with a specified memory device identifier, said logic selecting the specified one of said memory ports to unilaterally process one or more read requests includes:

logic comparing said memory device identifier specified by said read request with memory device identifiers specified by currently queued read requests for said other memory port; and circuitry issuing said read request to a memory port having a different memory device identifier that than that specified by said read request.

10. A computer-readable medium for processing read requests in a data processing system having a memory control device with at least two mirrored memory ports, said computer-readable medium comprising:

program code for receiving a read request on a system interconnect by a memory access control module within a memory controller that generates and processes signals for reading and writing data from and to a system memory that employs memory mirroring in which a first set of memory modules is mirrored by a corresponding second set of memory modules, wherein said memory access control module controls reading and writing between said memory controller and said first and second sets of memory modules, wherein said memory controller includes a pair of port interface modules for respectively interfacing each of said pair of memory ports with said memory access control module, each of said pair of port interface modules includes a write request buffer for storing pending write requests received by said memory access control module;

a read request buffer for storing pending read requests received by said memory access control module;

a command generator module having arbitration logic for selecting a read or write request to be issued onto said memory bus from among a plurality of pending read and write requests stored within said read and write request buffers; and a conflict queue module for, in response to read and write requests being issued onto said memory bus, holding said issued read and write requests pending processing;

program code for coupling a memory bus having a pair of memory ports to said memory controller with said first and second set of memory modules;

program code for coupling a central data buffer to said memory bus, wherein said central data buffer stores data for pending read and write requests issued onto said memory bus;

program code for coupling an error detection module to said central data buffer, wherein said error detection module contains logic for detecting uncorrectable errors in data returned by execution of read requests;

program code for issuing said received read request by a read scheduler only to a specified one of said at least two mirrored of memory ports; and program code for, responsive to receiving an uncorrectable error signal from said error detection module indicating an unrecoverable error resulting from said read request issued to said one mirrored memory port, issuing said received read request to an alternate of said at least two mirrored memory ports prior to reporting a read request status to said read request buffer and holding the corresponding read request during said issuing of said read request to said alternate memory port prior to said reporting said read request status to said read request buffer.

11. The computer-readable medium of claim 10, wherein said error detection module includes logic for detecting an error in the data returned responsive to said read request issued to said specified memory port.

12. The computer-readable medium of claim 10, further comprising logic for marking said read request issued to said alternate memory port as a failover read request.

13. The computer-readable medium of claim 12, further comprising, logic responsive to detecting an uncorrectable error resulting from said read request issued to said alternate memory port, that commences a machine check of memory devices coupled to said memory control device.

14. The computer-readable medium of claim 10, wherein said memory controller further includes logic that selects said specified one of said memory ports to unilaterally process one or more read requests.

15. The computer-readable medium of claim 14, wherein said logic selecting said specified one of said memory ports to unilaterally process one or more read requests includes logic that selects between said pair of memory ports in an alternating manner to select the memory port to issue a given read request.

16. The computer-readable medium of claim 14, wherein said logic selecting said specified one of said memory ports to unilaterally process one or more read requests includes:

means for monitoring a read request queue level for each of said pair of memory ports;

logic means responsive to determining that said read request queue level for a given one of said memory ports is less than a specified threshold level, that asserts a port available signal corresponding to said given memory port;

logic means responsive to determining that said read request queue level for one or both memory ports is greater than or equal to a specified threshold level, that asserts a port busy signal corresponding to said one or both memory ports; and logic that prioritizes said memory ports for being selected as a primary memory port such that said memory port having port available asserted is selected as the primary mirrored memory port prior to said memory port having port busy asserted.

17. The computer-readable medium of claim 14, wherein said logic selecting said specified one of said memory ports to unilaterally process one or more read requests includes:

logic that compares read request queue levels of said pair of memory ports; and circuitry that issues read requests to said memory port having the lower read request queue level.

18. The computer-readable medium of claim 14, wherein said read request issued to said specified memory port is associated with a specified memory device identifier, said logic selecting the specified one of said memory ports to unilaterally process one or more read requests includes:

logic comparing said memory device identifier specified by said read request with memory device identifiers specified by currently queued read requests for said other memory port; and circuitry issuing said read request to a memory port having a different memory device identifier that than that specified by said read request.

* * * * *